Nov. 17, 1931.            T. W. BEHAN            1,332,352
                         WASHING MACHINE
                        Filed Feb. 28, 1928
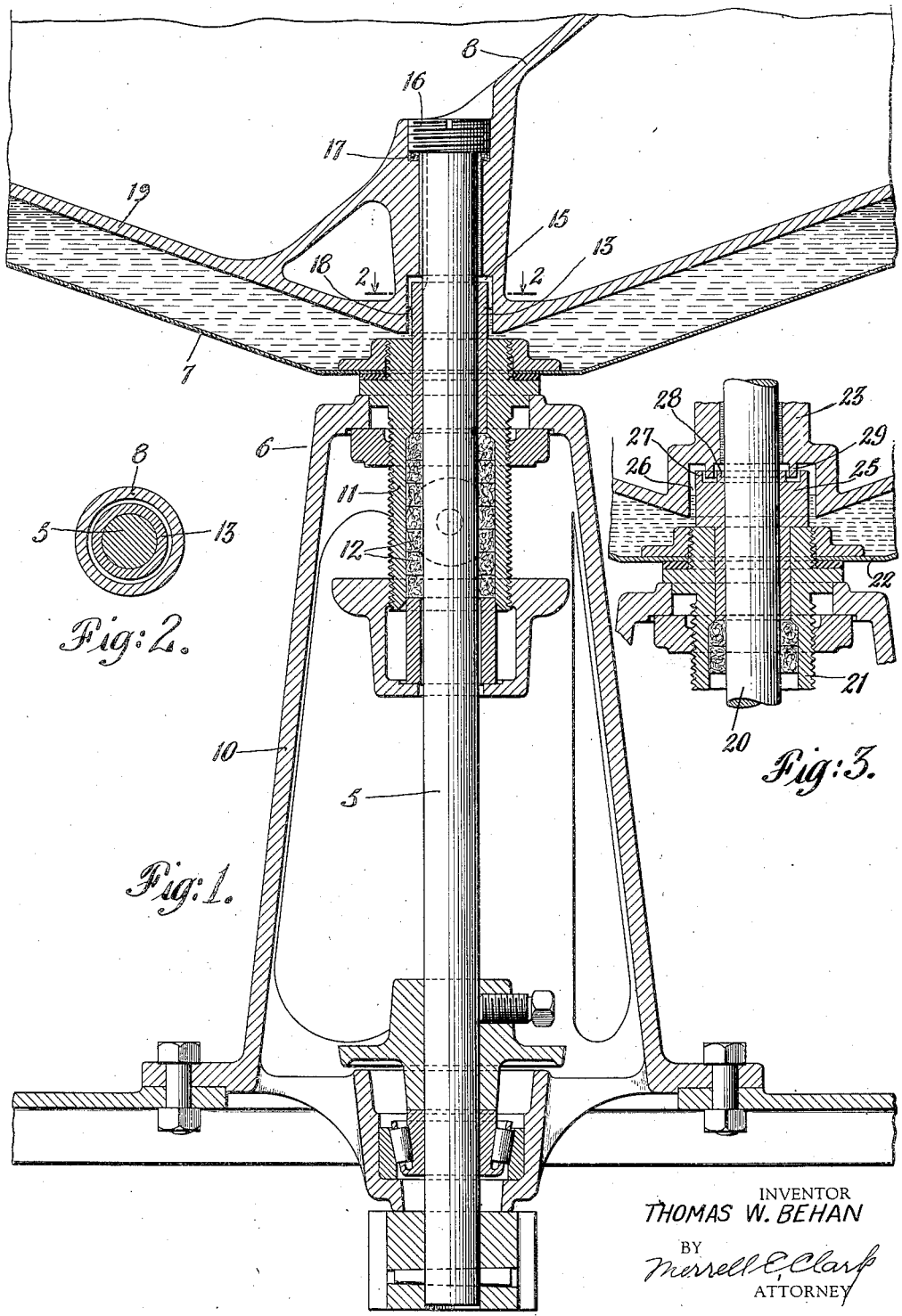
INVENTOR
THOMAS W. BEHAN
BY
Merrell E. Clark
ATTORNEY Patented Nov. 17, 1931

1,832,352

UNITED STATES PATENT OFFICE

THOMAS W. BEHAN, OF BINGHAMTON, NEW YORK, ASSIGNOR TO THE NINETEEN HUNDRED WASHER COMPANY, INC., OF BINGHAMTON, NEW YORK, A CORPORATION OF NEW YORK

WASHING MACHINE

Application filed February 28, 1928. Serial No. 257,663.

The present invention relates to washing machines and has for an object to provide an improved bearing construction for the agitator shaft.

It has been difficult, heretofore, to provide a satisfactory bearing for the agitator shaft where it extends through the bottom of the tub. The bearings, as made, have permitted the grit and dirt in the water to enter between the relatively moving surfaces of the shaft and the bearing and excessive wear with objectionable scoring of the shaft or bearing has frequently occurred.

The present invention provides an arrangement, whereby the water or other cleansing liquid in the tub is kept from contact with the agitator shaft at the bearing by means of an air trap which excludes the water from a confined area around the shaft, and thereby prevents grit carried by the water from entering the bearing. The invention has been developed in connection with the manufacture of washing machines of the type having an oscillating single blade agitator and for convenience of description such an embodiment is shown in the accompanying drawings, in which—

Figure 1 is a central sectional view of the bearing of the agitator shaft of a washing machine embodying the invention, Figure 2 is a sectional view taken on the line 2—2 of Fig. 1, and Figure 3 is a central sectional view showing one of the other possible embodiments of the invention.

In the embodiment shown for the purposes of illustrating the principles of the invention, an agitator shaft 5 extends through a bearing 6 in the bottom of a tub 7 and carries on its upper end an agitator 8. The bearing 6 is carried in a support 10 forming a part of the frame of the machine. The bearing may be of any suitable construction and is shown as comprising a gland 11 in which is compressed packing material 12 around the shaft. The bearing has also a sleeve 13 in which the shaft rotates and which sleeve extends upwardly substantially into the tub. The agitator 8 is formed with a cylindrical recess 15 to provide a hood extending over and enclosing the upwardly projecting end of the non-rotatable sleeve 13. This hood forms an air trap such that, as the tub is filled with water or other cleansing liquid, the confined space between the agitator 8 and the sleeve 13 will trap sufficient air to prevent the water from rising substantially in this confined space. The agitator is entirely below the normal water level and in use is entirely submerged so that the water trap is well below the normal water level.

It is possible to pack the gland 11 tight enough to practically prevent escape of air from the air trap downwardly along the shaft and thus to make unnecessary any such expedient as the pumping of air into the air trap during operation. The possibility of escape of air upwardly along the shaft and between it and the agitator is prevented by a plug 16 with a packing 17 to insure an air tight joint. The water is shown as having risen somewhat in the recess 15, as indicated at 18, as may be expected in practice.

The foregoing method of exclusion of water from the bearing may be applied to various structures having agitators of various types. In the preferred embodiment of the invention shown, the agitator comprises a single agitating blade and a disc 19 which may be conical but which at least presents on its underside a smooth surface which, during rotation, will agitate the water beneath as little as possible. This arrangement provides a zone of comparatively quiet water around the bearing and permits settlement of the heavy grit and dirt while the floating material will not come into this zone. By this arrangement the bearing is well protected from access of grit even in case of leakage of air from the air trap. The agitator shown may be removably fitted to the top of the shaft 5 in a manner to permit it to be lifted off for the cleaning of the tub, suitable splines being provided to hold the agitator in fixed position during operation.

The embodiment shown in Fig. 3 is in general similar to that shown in Fig. 1. A shaft 20 extends through a gland 21 mounted in the tub bottom 22 and carries at its upper end an agitator 23. A sleeve 25 in which the shaft rotates extends upwardly into the recess 26 of the agitator 23. In this construction the principles of preventing water from passing to the surface of the shaft by means of an air trap is applied in a structure comprising a series of annular flanges on the horizontal surface of the upper end of the sleeve 25 and the opposed face of the agitator 23. As shown, the sleeve is provided with two upwardly projecting annular flanges 27, 28 which cooperate with the one flange 29 extending downwardly from the agitator 23. In addition to the staggered flanges 27, 28 and 29 the recess 26 is preferably also provided, although it will be understood that a series of flanges may be arranged to accomplish the desired function.

The foregoing particular description is illustrative merely and is not intended as defining the limits of the invention.

I claim—

1. In a washing machine a tub, an agitator shaft extending through the bottom of said tub, a bearing for said shaft comprising an air excluding packing gland and an upwardly extending sleeve terminating adjacent the bottom of said tub, means carried by the shaft extending over the top of said sleeve and downwardly over the outside thereof to form an air trap preventing water in the tub from passing over the top of said sleeve, substantially as described.

2. In a washing machine a tub, an agitator shaft extending through the bottom of said tub, an air excluding bearing for said shaft comprising an upwardly extending sleeve terminating adjacent the bottom of said tub, an agitator secured to said shaft formed with a hood extending over and closely enclosing the top of the sleeve to form an air trap to prevent water from passing over the top of said sleeve, substantially as described.

3. In a washing machine a tub, an agitator shaft extending through the bottom of said tub, a bearing for said shaft comprising an air excluding packing gland and an upwardly extending sleeve terminating adjacent the bottom of said tub, an agitator secured to said shaft comprising a disc and a recess at the center thereof extending over and closely enclosing the top of the sleeve to form an air trap excluding water from the top of said sleeve whereby a zone of quiet water with an air trap at the center thereof is provided around the bearing.

4. In a washing machine a tub, an agitator shaft extending through the bottom of said tub and terminating adjacent the bottom of said tub, a bearing for said shaft comprising an upwardly extending sleeve, an agitator on said shaft comprising a disc presenting a smooth bottom to provide a zone of quiet water in the bottom of the tub during operation, said disc having a central cylindrical recess closely enclosing the top of said sleeve to form an air-trap to prevent water from passing over the top of the sleeve, and an air excluding packing within said bearing sleeve and surrounding said shaft, substantially as described.

5. In a washing machine a tub, an agitator shaft extending through the bottom of said tub, a bearing in the tub bottom through which said shaft extends, and means forming an air trap above said bearing to prevent water in the tub from entering said bearing, comprising a member surrounding said bearing at its upper end and forming a constricted air chamber down to the surface of the water and an air excluding packing gland surrounding said shaft below said bearing substantially as described.

6. In a washing machine a tub, an agitator shaft extending from the bottom of said tub, a bearing for said shaft comprising an upwardly extending sleeve and means to form an air pocket around the top of said sleeve to prevent water passing over the sleeve to the shaft, said pocket having an annular portion of restricted cross sectional area toward its lower end surrounding said sleeve and in contact with the surface of the water in said tub.

In testimony whereof, I have signed my name to this specification this 23rd day of February, 1928.

THOMAS W. BEHAN.